(12) United States Patent
Mizutani et al.

(10) Patent No.: US 9,030,471 B2
(45) Date of Patent: May 12, 2015

(54) INFORMATION PROCESSING APPARATUS AND DISPLAY CONTROL METHOD

(71) Applicant: Kabushiki Kaisha Toshiba, Tokyo (JP)

(72) Inventors: Fumitoshi Mizutani, Ome (JP); Takehiro Ogawa, Hamura (JP); Eita Shuto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 129 days.

(21) Appl. No.: 13/677,155

(22) Filed: Nov. 14, 2012

(65) Prior Publication Data

US 2013/0181980 A1 Jul. 18, 2013

(30) Foreign Application Priority Data

Jan. 12, 2012 (JP) ................................. 2012-003981

(51) Int. Cl.
*G06T 15/00* (2011.01)
*H04N 13/04* (2006.01)
(52) U.S. Cl.
CPC ............ *G06T 15/00* (2013.01); *H04N 13/0402* (2013.01); *H04N 13/0456* (2013.01)
(58) Field of Classification Search
CPC . G06T 15/00; H04N 13/0402; H04N 13/0456
USPC .................... 345/419, 7; 348/51–60
See application file for complete search history.

(56) References Cited

U.S. PATENT DOCUMENTS

| 8,301,013 | B2 | 10/2012 | Yamashita et al. | |
| 2006/0139448 | A1* | 6/2006 | Ha et al. | 348/51 |
| 2010/0073347 | A1 | 3/2010 | Takagi et al. | |
| 2012/0113095 | A1* | 5/2012 | Hwang et al. | 345/419 |
| 2012/0151416 | A1* | 6/2012 | Bell et al. | 715/848 |
| 2013/0021435 | A1 | 1/2013 | Yamashita et al. | |

FOREIGN PATENT DOCUMENTS

| JP | 2002-049004 A | 2/2002 |
| JP | 2010-078653 A | 4/2010 |
| JP | 2012-227618 | 11/2012 |
| JP | 2012-252711 | 12/2012 |
| WO | WO 2010/058546 | 5/2010 |

OTHER PUBLICATIONS

Office Action dated Mar. 5, 2013, in Japanese Application No. 2012-003981, in 4 pages.

* cited by examiner

*Primary Examiner* — Xiao M. Wu
*Assistant Examiner* — Chong Wu
(74) *Attorney, Agent, or Firm* — Knobbe Martens Olson & Bear LLP

(57) ABSTRACT

According to one embodiment, an information processing apparatus sets, as the three-dimensional image display area, a first area corresponding to a window of a first application program such that a three-dimensional image is displayed in the first area. The apparatus sets as the three-dimensional image display area, if a 3D request is received from a second application program, one of the first area and a second area corresponding to a window of the second application program, and causes the other one of the first application program and the second application program to render a single two-dimensional image such that the single two-dimensional image is displayed in the other one of the first area and the second area.

6 Claims, 7 Drawing Sheets

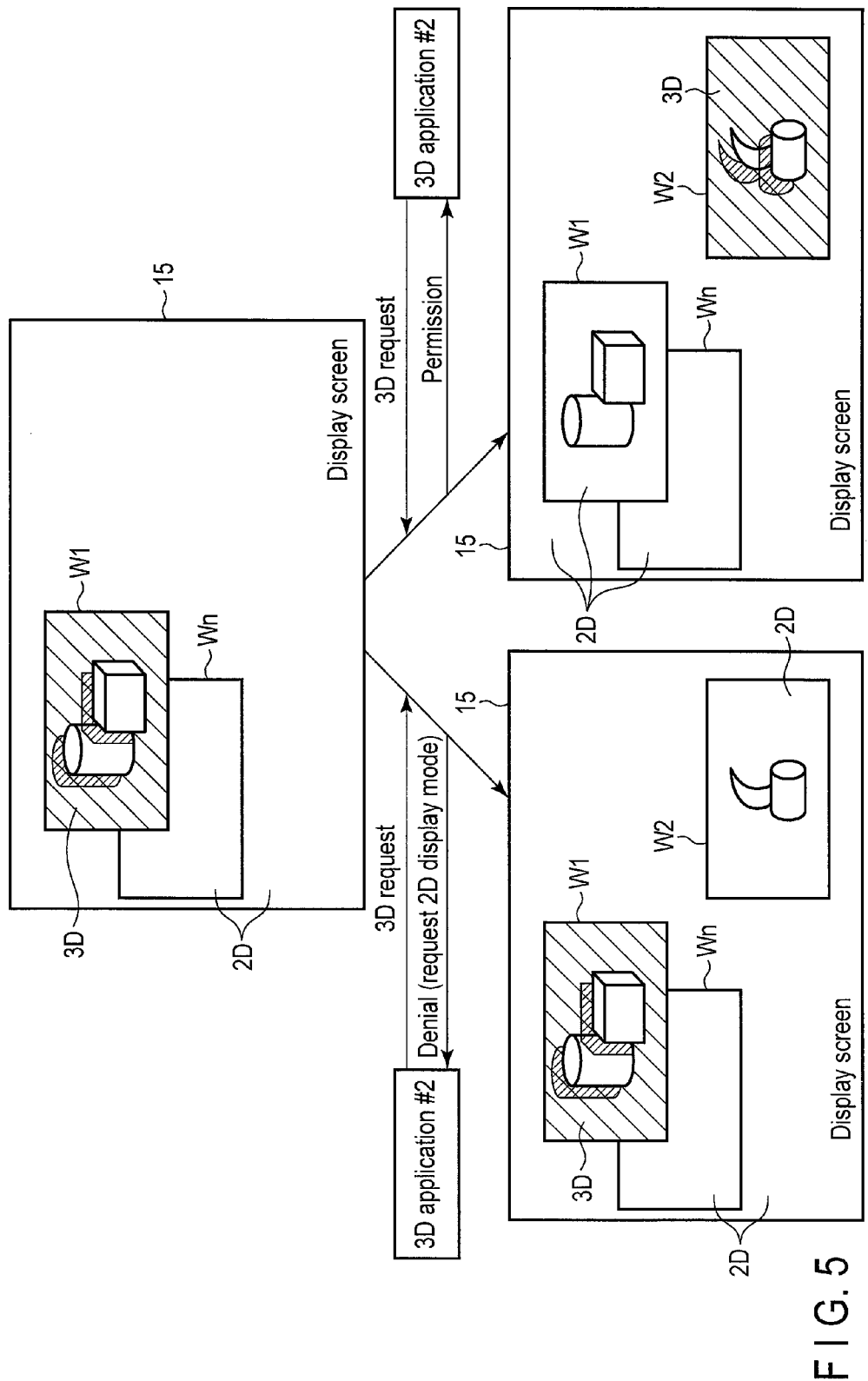
F I G. 5

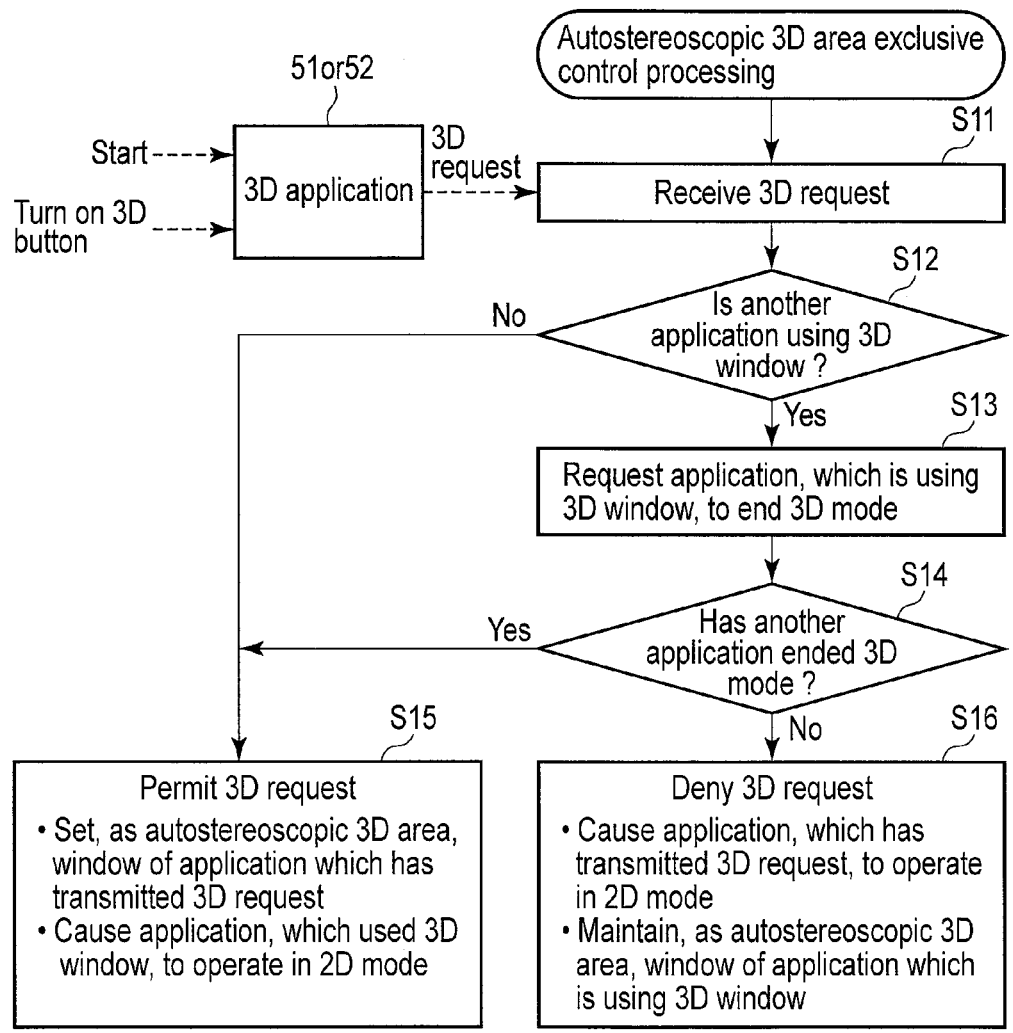
F I G. 7

INFORMATION PROCESSING APPARATUS AND DISPLAY CONTROL METHOD

CROSS-REFERENCE TO RELATED APPLICATIONS

This application is based upon and claims the benefit of priority from prior Japanese Patent Application No. 2012-003981, filed Jan. 12, 2012, the entire contents of which are incorporated herein by reference.

FIELD

Embodiments described herein relate generally to an information processing apparatus including an autostereoscopic three-dimensional display, and a display control method applied to the apparatus.

BACKGROUND

In recent years, various kinds of display devices for viewing a stereoscopic image (three-dimensional image) have been provided. One of such display devices adopts an autostereoscopic method (autostereoscopic 3D method). The autostereoscopic method, for example, simultaneously displays an image for the left eye and that for the right eye on a liquid crystal display (LCD) (a space division method), and controls directions in which a lenticular lens arranged on the LCD emits light beams corresponding to pixels within the images (a lenticular method). This enables the user to view the pixels of the image for the left eye with the left eye, and those of the image for the right eye with the right eye, thereby perceiving a three-dimensional image.

An autostereoscopic three-dimensional display which can display a three-dimensional image and a two-dimensional image on the same screen has recently been developed. In such an autostereoscopic three-dimensional display, a partial area within the screen can be used as a three-dimensional image display area (autostereoscopic 3D area) for displaying a three-dimensional image.

A personal computer including an autostereoscopic 3D display has also been developed. This computer can display a three-dimensional image on a partial area (autostereoscopic 3D area) within a screen while displaying a two-dimensional image on that screen.

It is, however, difficult to enable to simultaneously set a plurality of areas within the screen as autostereoscopic 3D areas because, for example, the cost increases. Therefore, exclusive control in which the number of simultaneously executable 3D-capable application programs is limited to one is conventionally used.

In the exclusive control, when a certain 3D-capable application program has already been executed, another 3D-capable application program does not start even if the user performs an operation for starting it.

Such conventional exclusive control in which an application program which the user tries to start is prohibited from starting, however, may give the user an unnatural impression. The user may misinterpret this to mean that the computer has failed. An error message may be displayed to notify the user of the reason the application program does not start. Displaying such a message, however, may complicate processing.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is an exemplary view for illustrating further improved exclusive control for preventing a conflict between 3D-capable applications;

FIG. 7 is an exemplary flowchart illustrating a procedure of autostereoscopic 3D area exclusive control processing executed by the information processing apparatus according to the embodiment.

DETAILED DESCRIPTION

Various embodiments will be described hereinafter with reference to the accompanying drawings.

In general, according to one embodiment, an information processing apparatus includes an autostereoscopic three-dimensional display capable of displaying a three-dimensional image on a three-dimensional image display area set in a screen. The information processing apparatus comprises a setting module and a control module. The setting module sets, as the three-dimensional image display area, a first area in the screen corresponding to a window of a first application program such that a three-dimensional image based on a plurality of parallax images corresponding to content processed by the first application program is displayed in the first area in the screen. The control module sets as the three-dimensional image display area, if a request to display a three-dimensional image is received from a second application program, one of the first area in the screen and a second area in the screen corresponding to a window of the second application program such that a three-dimensional image based on a plurality of parallax images corresponding to content processed by one of the first application program and the second application program is displayed in the one of the first area and the second area, and causes the other one of the first application program and the second application program to render a single two-dimensional image corresponding to content processed by the other one of the first application program and the second application program such that the single two-dimensional image is displayed on the other one of the first area and the second area.

Figure 1:
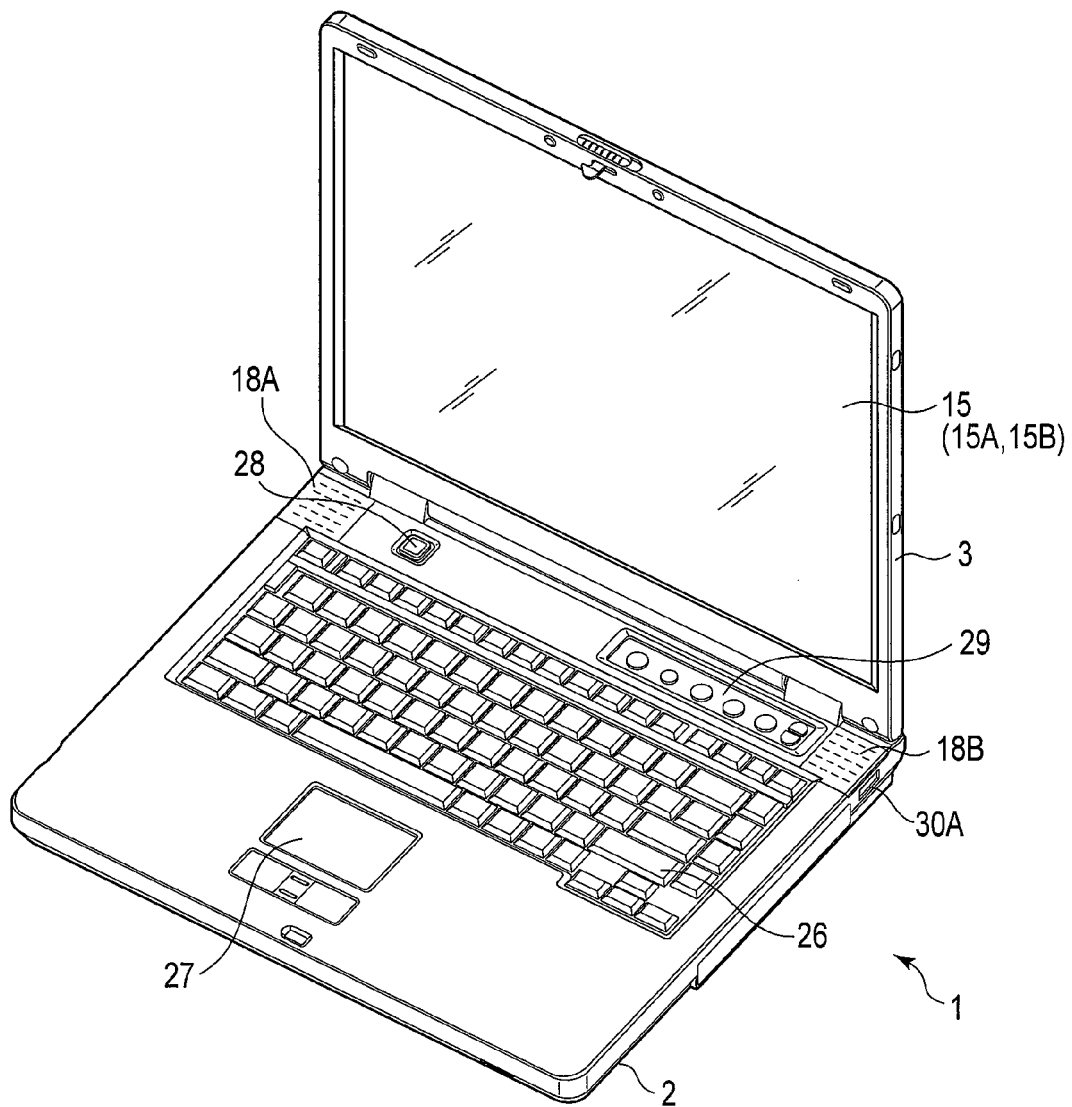
FIG. 1 is an exemplary perspective view illustrating an outer appearance of an information processing apparatus according to an embodiment.

FIG. 1 is a perspective view illustrating an outer appearance of the information processing apparatus according to the embodiment. The information processing apparatus is implemented as, for example, a notebook personal computer 1. The information processing apparatus may also be implemented as a tablet computer, a PDA, a smartphone, or the like.

As shown in FIG. 1, the computer 1 includes a computer main body 2 and a display unit 3.

The display unit 3 incorporates an autostereoscopic three-dimensional display (autostereoscopic 3D display) 15 capable of displaying a three-dimensional image on a three-dimensional image display area which is set in a screen. For the autostereoscopic 3D display 15, an autostereoscopic method (for example, an integral imaging method, a lenticular method, a parallax barrier method, or the like) is used to display a three-dimensional image. When the user sees an image displayed on the autostereoscopic 3D display 15, he/she can perceive a three-dimensional image with the naked eye.

The display unit 3 is attached to the computer main body 2 to rotatable between the open position where the upper surface of the computer main body 2 is exposed and the closed position where that upper surface is covered with the display unit 3. The autostereoscopic 3D display 15 includes a liquid crystal display (LCD) 15A and a lens unit 15B. The lens unit 15B is laminated on the LCD 15A. The lens unit 15B includes a plurality of lens mechanisms for respectively emitting, in predetermined directions, a plurality of light beams corresponding to a plurality of pixels included in an image displayed on the LCD 15A. The lens unit 15B is, for example a liquid crystal gradient index (GRIN) lens which can electrically turn on or off a function necessary for displaying of a three-dimensional image. Since the liquid crystal GRIN lens creates a refractive index distribution with an electrode using a flat liquid crystal layer, it is possible to, for example, display a three-dimensional image in a designated area within the screen, and display a two-dimensional image in another area. That is, using different refractive indices of the lens for an area where a three-dimensional image is displayed and an area where a two-dimensional image is displayed, it is possible to partially switch, within the screen, between a three-dimensional image display area (autostereoscopic 3D area) for displaying a three-dimensional image and a two-dimensional image display area for displaying a two-dimensional image.

In the autostereoscopic 3D area within the screen, for example, the pixels of an image for the left eye and those of an image for the right eye are alternately displayed in the horizontal direction. A lens module corresponding to the autostereoscopic 3D area refracts light corresponding to each pixel of the image for the left eye and light corresponding to each pixel of the image for the right eye so that the alternately displayed pixels of the images for the left and right eyes reach the left and right eyes, respectively. On the other hand, in the two-dimensional image display area (2D area), a lens module corresponding to the 2D area emits light corresponding to each pixel of a two-dimensional image displayed in the 2D area without refracting it. It is possible to arbitrarily designate the position and size of an area within the screen, which should be set as the autostereoscopic 3D area. The other area within the screen other than the autostereoscopic 3D area is set as the 2D area.

The computer main body 2 has a thin box-shaped housing and includes, on its upper surface, a keyboard 26, a power button 28 to power on/off the computer 1, an input operation panel 29, a pointing device (touchpad) 27, and loudspeakers 18A and 18B. Various operation buttons are provided on the input operation panel 29. The group of buttons includes a group of operation buttons for controlling a TV function (viewing, recording, playing back recorded broadcast program data/video data).

A TV broadcast antenna terminal 30A is provided on, for example, the right surface of the computer main body 2. Furthermore, an external display connection terminal conforming to the High-Definition Multimedia Interface (HDMI) standard is provided on, for example, the rear surface of the computer main body 2. The external display connection terminal is used to output image data (for example, moving image data) contained in image content data such as broadcast program data to an external display.

Figure 2:
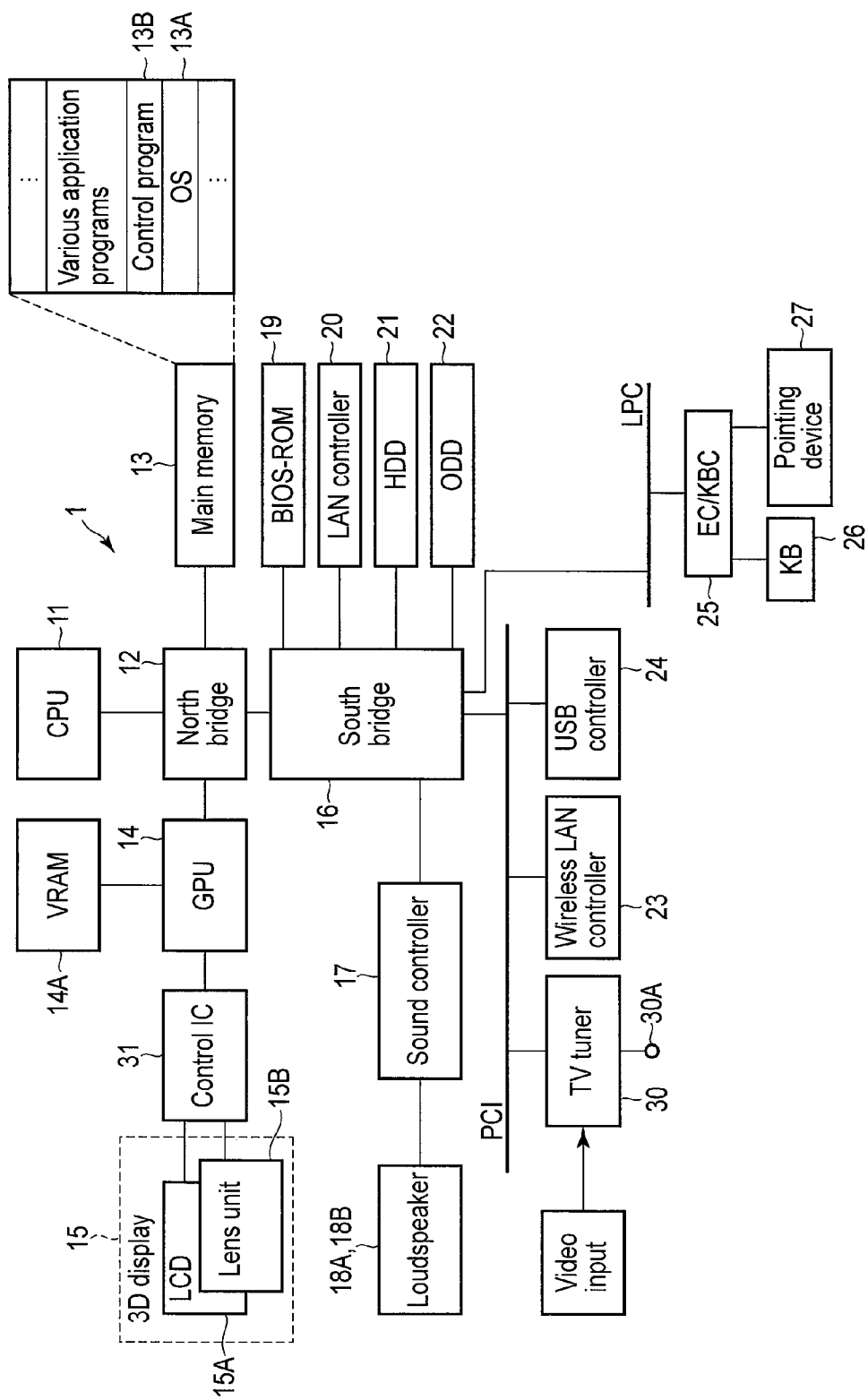
FIG. 2 is an exemplary block diagram illustrating a system configuration of the information processing apparatus according to the embodiment.

FIG. 2 is a block diagram illustrating a system configuration of the computer 1.

As shown in FIG. 2, the computer 1 includes a CPU 11, a north bridge 12, a main memory 13, a graphics processing unit (GPU) 14, a video memory (VRAM) 14A, the autostereoscopic 3D display 15, a south bridge 16, a sound controller 17, the loudspeakers 18A and 18B, a BIOS-ROM 19, a LAN controller 20, a hard disk drive (HDD) 21, an optical disk drive (ODD) 22, a wireless LAN controller 23, a USB controller 24, an embedded controller/keyboard controller (EC/KBC) 25, the keyboard (KB) 26, a pointing device 27, a TV tuner 30, and a control IC 31.

The CPU 11 is a processor configured to control the operation of the computer 1. The CPU 11 executes an operating system (OS) 13A, a control program 13B, and various application programs, which are loaded from the HDD 21 to the main memory 13. The application programs include several 3D-capable application programs (to be referred to as 3D application programs hereinafter). The 3D application programs are, for example, a TV application program, a player application program, a game application program, and the like.

The TV application program is a program for, for example, viewing and recording broadcast contents, which can process both broadcast program data in a 2D format and broadcast program data in a 3D format. As a 3D format, a side-by-side format, a top-and-bottom format, and the like are well known.

The TV application program also has a 2D-3D conversion function of converting, in real time, the two-dimensional image data of each frame in broadcast program data in a 2D format into three-dimensional image data. In 2D-3D conversion, a depth value is estimated for each pixel of the two-dimensional image data, and a plurality of parallax images, for example, two parallax images including an image for the left eye and that for the right eye are generated based on the estimated depth value for each pixel.

The player application program is a program for playing back video contents stored in a storage medium such as a DVD, which can process 2D contents and 3D contents. The player application program may also have the above-described 2D-3D conversion function.

The control program 13B is a program configured to control each 3D application program. In general system design, the number of areas within the screen which can be set as the autostereoscopic 3D area is often limited to, for example, one to avoid cost increase. This is because many hardware resources are needed to simultaneously display different three-dimensional images in a plurality of areas within the screen, thereby increasing the cost.

If, however, conventional exclusive control in which the number of simultaneously startable 3D application programs is limited to one is simply used, a 3D application program which the user tries to start is prohibited from starting, as described above. The user, therefore, may misinterpret this to mean that the computer has failed. To deal with this problem, the control program 13B allows to simultaneously execute a plurality of 3D application programs instead of limiting the number of simultaneously startable 3D application programs to one. Then, the control program 13B allows one of the plurality of 3D application programs to use the autostereoscopic 3D area, and displays, on the autostereoscopic 3D area, a three-dimensional image based on a plurality of parallax images (for example, two parallax images including an image for the left eye and that for the right eye) rendered by the 3D application program. The control program 13B assigns the two-dimensional image display area to each of other 3D application programs. This enables the plurality of 3D application program to coexist.

The control program 13B also has a function of adaptively controlling display modes (2D mode, 3D mode) of each of the 3D application programs according to the use state of the autostereoscopic 3D area.

The CPU 11 also executes a Basic Input/Output System (BIOS) stored in the BIOS-ROM 19. The BIOS is a program for hardware control.

The north bridge 12 is a bridge device which connects a local bus of the CPU 11 with the south bridge 16. The north bridge 12 incorporates a memory controller for making access control of the main memory 13. The north bridge 12 also has a function of communicating with the GPU 14.

The GPU 14 is a device configured to control the LCD 15 used as the display of the computer 1. A display signal generated by the GPU 14 is sent to the LCD 15. The LCD 15 displays an image based on the display signal.

The south bridge 16 controls devices on a Peripheral Component Interconnect (PCI) bus and those on a Low Pin Count (LPC) bus. The south bridge 16 incorporates an Integrated Drive Electronics (IDE) controller configured to control the HDD 21 and the ODD 22, and a memory controller configured to make access control of the BIOS-ROM 19. The south bridge 16 also has a function of communicating with the sound controller 17 and the LAN controller 20.

The sound controller 17 is a sound source device, which outputs audio data to be played back to the loudspeakers 18A and 18B. The LAN controller 20 is, for example, a wired communication device which performs wired communication conforming to the Ethernet standard. The wireless LAN controller 23 is, for example, a wireless communication device which performs wireless communication conforming to the IEEE 802.11 standard. The USB controller 24 communicates with an external device via, for example, a cable conforming to the USB 2.0 standard.

The EC/KBC 25 is a single-chip microcomputer in which an embedded controller for power management and a keyboard controller for controlling the keyboard (KB) 26 and pointing device 27 are integrated. The EC/KBC 25 has a function of powering on/off the computer 1 in response to a user operation.

The TV tuner 30 is a reception device configured to receive broadcast program data broadcast by means of a television (TV) broadcast signal, and is connected to the antenna terminal 30A. The TV tuner 30 is implemented as, for example, a digital TV tuner capable of receiving digital broadcast program data such as terrestrial digital TV broadcasting. The TV tuner 30 also has a function of capturing video data input from an external device.

In response to a request by the control program 13B, the control IC 31 converts the arrangement of pixels to be displayed in the autostereoscopic 3D area so that the pixels of a plurality of parallax images are alternately arranged in the horizontal direction in the autostereoscopic 3D area. To display a 3D image using two parallax images including an image for the left eye and that for the right eye, the control IC 31 converts the arrangement of pixels to be displayed in the autostereoscopic 3D area so that the pixels of the images for the left and right eyes are alternately displayed in the horizontal direction in the autostereoscopic 3D area.

Furthermore, in response to a request by the control program 13B, the control IC 31 controls a portion of the lens unit 15B corresponding to the autostereoscopic 3D area so that this portion of the lens unit 15B has a predetermined refractive index distribution for 3D display. This produces a lens effect in the portion of the lens unit 15B. In the autostereoscopic 3D area, the emitting direction of light corresponding to each pixel of the image for the left eye and that of light corresponding to each pixel of the image for the right eye are controlled so that each pixel of the image for the left eye and that of the image for the right eye reach the left and right eyes, respectively. In this case, an observation position where it is possible to correctly observe the image for the left eye and that for the right eye may be limited to a given region.

Face tracking, therefore, may be used as needed. In face tracking, according to the observation position of an observer (for example, the position of the face of the observer or the position of each of the left and right eyes of the observer), the emitting direction of light corresponding to each pixel of the image for the left eye and that of light corresponding to each pixel of the image for the right eye are adaptively controlled so that the light corresponding to each pixel of the image for the left eye reaches the left eye and the light corresponding to each pixel of the image for the right eye reaches the right eye. This can widen a range in which the user can perceive a three-dimensional image.

Instead of using face tracking, a number of parallax images may be displayed using the integral imaging method to widen the range in which the user can perceive a three-dimensional image.

Exclusive control for preventing a conflict between 3D application programs will be described next with reference to FIGS. 3 to 5.

Figure 3:
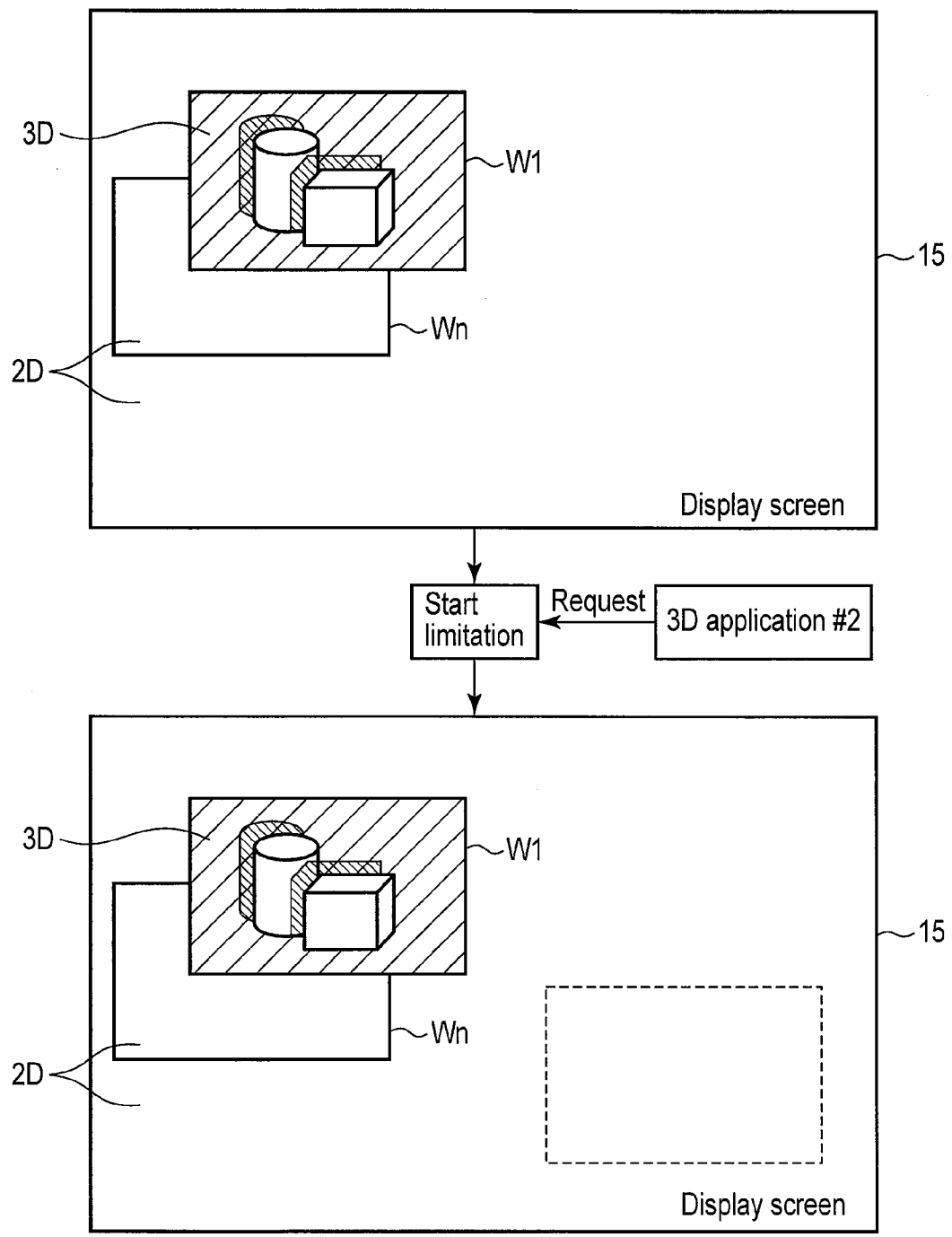
FIG. 3 is an exemplary view for illustrating exclusive control for preventing a conflict between 3D-capable applications.

FIG. 3 is a view for explaining a certain exclusive control in which the number of simultaneously executable 3D-capable application programs is limited to one. As described above, it is possible to simultaneously display a three-dimensional image and a two-dimensional image on the display screen of the autostereoscopic 3D display 15. Referring to FIG. 3, a three-dimensional image is displayed in a window W1 of a first 3D application program, and a two-dimensional image is displayed in each of another window Wn and a desktop screen. An area of the display screen, which corresponds to window W1, is set as an autostereoscopic 3D area.

If starting a second 3D application program is requested by a user operation in this state, the second 3D application program is prohibited from starting. A window corresponding to the second 3D application program, therefore, is not displayed on the display screen.

Figure 4:
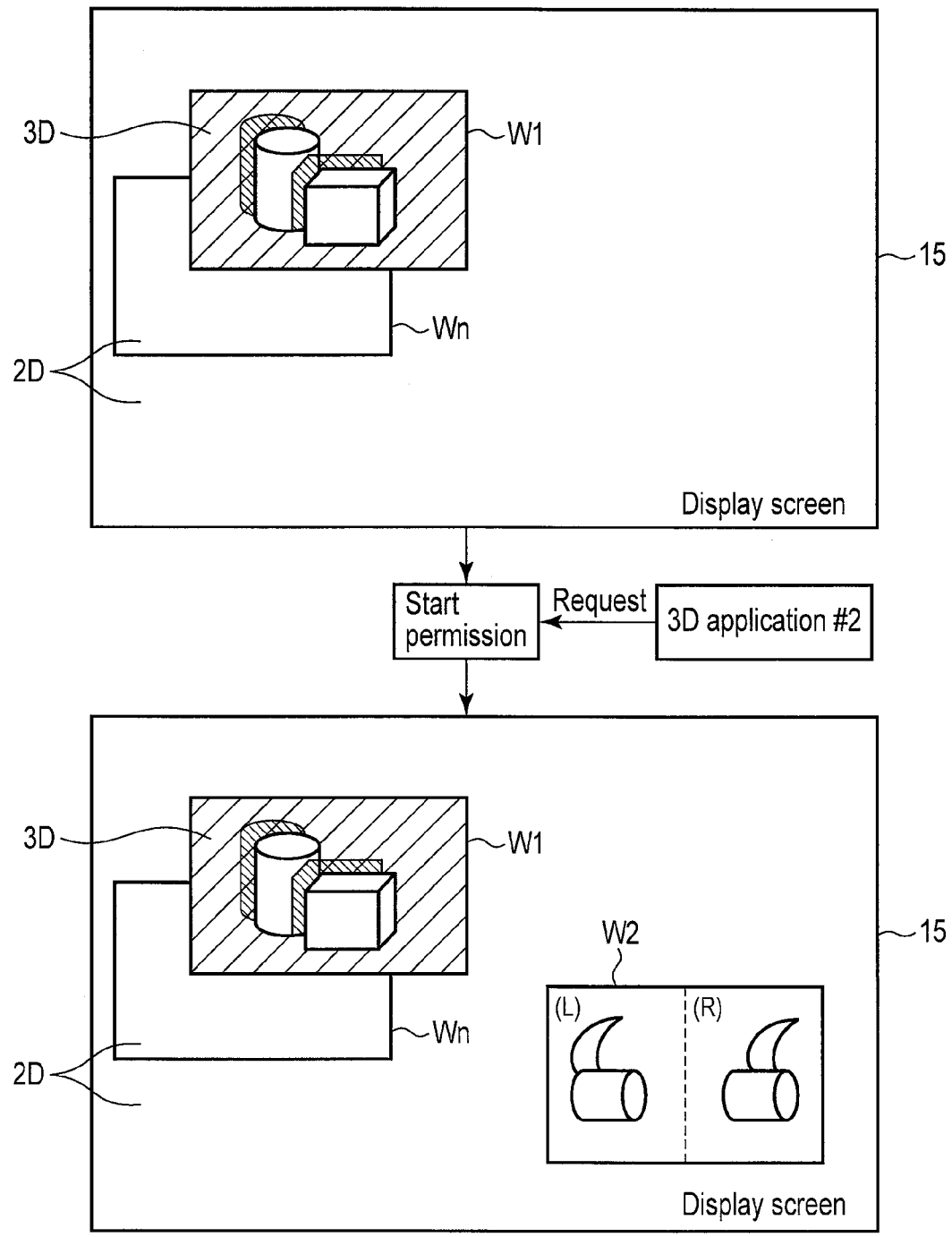
FIG. 4 is an exemplary view for illustrating improved exclusive control for preventing a conflict between 3D-capable applications.

FIG. 4 is a view for explaining an example of improved exclusive control for preventing a conflict between 3D-capable applications. In the exclusive control shown in FIG. 4, when a three-dimensional image is displayed in window W1 of the first 3D application program, and starting the second 3D application program is requested by a user operation, the second 3D application program is allowed to start.

In this case, an area of the display screen, which corresponds to one of window W1 of the first 3D application program and a window W2 of the second 3D application program, is set as an autostereoscopic 3D area, and an area of the display screen, which corresponds to the other window, is set as a two-dimensional image display area. Referring to FIG. 4, the area of the display screen, which corresponds to window W1 of the first 3D application program, is set as the autostereoscopic 3D area. Such improved exclusive control limits the number of 3D application programs which use the autostereoscopic 3D area to one, instead of limiting the number of simultaneously startable 3D application programs to one.

The second 3D application program, however, may operate in a 3D mode. In the 3D mode, the second 3D application program renders, in the VRAM 14A, a plurality of parallax images, for example, two parallax images including an image for the left eye and that for the right eye. Since, however, the area of the display screen, which corresponds to window W2 of the second 3D application program, is not set as the autostereoscopic 3D area, the two rendered parallax images are displayed intact on the area of the display screen, which corresponds to window W2. The light corresponding to the two parallax images reaches the observer without being refracted. If the second 3D application program renders the two parallax images in the side-by-side format as shown in FIG. 4, the observer observes these two images intact. A phenomenon in which an observer visually perceives two images (an image for the left eye and that for the right eye) corresponding to the same content at the same time may give an unnatural impression to the observer, that is, the user.

To deal with this program, in this embodiment, further improved exclusive control shown in FIG. 5 is executed to prevent such phenomenon in which the user visually perceives two images (an image for the left eye and that for the right eye) corresponding to the same content at the same time.

In the exclusive control shown in FIG. 5, upon receiving a request (3D request) to display a three-dimensional image from the second 3D application program when a three-dimensional image is displayed in window W1 of the first 3D application program, the control program 13B assigns an autostereoscopic 3D area to one of the first 3D application program and the second 3D application program, and causes the other one of the first 3D application program and the second 3D application program to operate in a 2D mode.

FIG. 5 shows, in the lower left part, a display screen when the autostereoscopic 3D area is continuously assigned to the first 3D application program and the second 3D application program is controlled to operate in the 2D mode. The control program 13B notifies the second 3D application program of denial of the 3D request, and causes the second 3D application program to operate in the 2D mode. In the 2D mode, the second 3D application program renders, in the VRAM 14A, a single two-dimensional image (for example, a single two-dimensional video) corresponding to content processed by the second 3D application program. Since, therefore, one two-dimensional image is displayed in window W2 of the second 3D application program, it is possible to prevent, from occurring, a phenomenon in which two images (an image for the left eye and that for the right eye) corresponding to the same content are simultaneously displayed in window W2.

FIG. 5 shows, in the lower right part, a display screen when assignment of the autostereoscopic 3D area to the first 3D application program is cancelled, and the autostereoscopic 3D area is newly assigned to the second 3D application program. The control program 13B causes the first 3D application program to operate in the 2D mode, and notifies the second 3D application program of permission of the 3D request.

The control program 13B changes the area of the display screen, which should be set as the autostereoscopic 3D area, from the area corresponding to window W1 of the first 3D application program to the area corresponding to window W2 of the second 3D application program. A three-dimensional image based on a plurality of parallax images (for example, two parallax images including an image for the left eye and that for the right eye) rendered by the second 3D application program is displayed in window W2 of the second 3D application program.

On the other hand, the operation mode of the first 3D application program is switched from the 3D mode to the 2D mode. Thus, the first 3D application program renders, in the VRAM 14A, a single two-dimensional image (for example, a single two-dimensional video) corresponding to content processed by the first 3D application program. Since, therefore, the single two-dimensional image is displayed in window W1 of the first 3D-application program, it is possible to prevent, from occurring, a phenomenon in which the user simultaneously perceives two images (an image for the left eye and that for the right eye) corresponding to the same content.

As described above, in the embodiment, the display mode (2D mode or 3D mode) of each of the two 3D application programs is controlled so that a three-dimensional image is displayed in the window of one of the two 3D application programs, and a single two-dimensional image is displayed in the window of the other 3D application program.

Figure 6:
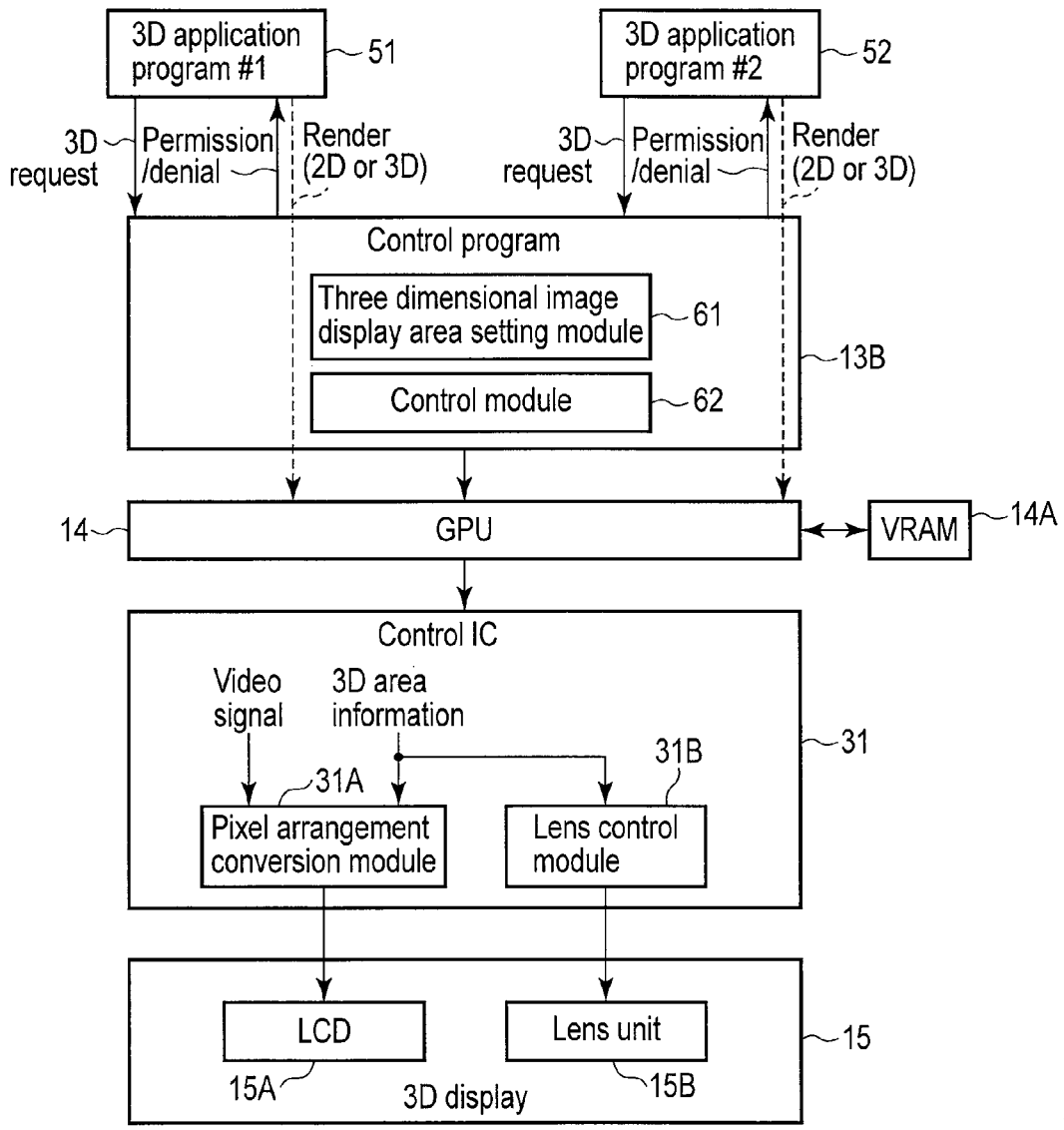
FIG. 6 is an exemplary block diagram illustrating a configuration of a 3D display system used in the information processing apparatus according to the embodiment.

A configuration example of a 3D display system used in the embodiment will be described with reference to FIG. 6.

As a plurality of 3D-capable application programs executed by the personal computer 1 of the embodiment, a first 3D-capable application program 51 and a second 3D-capable application program 52 will be exemplified here.

The first 3D-capable application program 51 has a function of presenting, to the user, content processed by itself in a 3D mode or 2D mode. While the first 3D-capable application program 51 is in the 3D mode, it renders, in the VRAM 14A, a plurality of parallax images (for example, two parallax images including an image for the left eye and that for the right eye) corresponding to the content processed by itself. In this case, the first 3D-capable application program 51 may render, in the VRAM 14A, the image for the left eye and that for the right eye in the side-by-side format or the like. While the first 3D-capable application program 51 is in the 2D mode, it renders a single two-dimensional image corresponding to the content processed by itself in the VRAM 14A.

Upon start of the first 3D-capable application program 51 or press of a 3D button on the screen (the window) of the first 3D-capable application program 51, the first 3D-capable application program 51 transmits, to the control program 13B, a request (3D request) to display a three-dimensional image. If the control program 13B permits the 3D request, the first 3D-capable application program 51 can operate in the 3D mode.

Similarly, the second 3D-capable application program 52 also has a function of presenting, to the user, content processed by itself in a 3D mode or 2D mode. While the second 3D-capable application program 52 is in the 3D mode, it renders, in the VRAM 14A, a plurality of parallax images (for example, two parallax images including an image for the left eye and that for the right eye) corresponding to the content processed by itself. In this case, the second 3D-capable application program 52 may render, in the VRAM 14A, the image for the left eye and that for the right eye in the side-by-side format or the like. While the second 3D-capable application program 52 is in the 2D mode, it renders a single two-dimensional image corresponding to the content processed by itself in the VRAM 14A.

Upon start of the second 3D-capable application program 52 or press of a 3D button on the screen (the window) of the second 3D-capable application program 52, the second 3D-capable application program 52 transmits, to the control program 13B, a request (3D request) to display a three-dimensional image. If the control program 13B permits the 3D request, the second 3D-capable application program 52 can operate in the 3D mode.

The control program 13B includes a three-dimensional image display area setting module 61 and a control module 62. The three-dimensional image display area setting module 61 executes processing for displaying a three-dimensional image based on a plurality of parallax images rendered by a given 3D application program.

Assume that the control program 13B receives a 3D request from the first 3D-capable application program 51 when the autostereoscopic 3D area has not been set in the screen of the autostereoscopic 3D display 15.

The three-dimensional image display area setting module 61 sets a first area in the screen as the autostereoscopic 3D area so that a three-dimensional image based on a plurality of parallax images corresponding to content processed by the first 3D-capable application program 51 is displayed in the first area in the screen corresponding to the window of the first 3D-capable application program 51. In this case, the three-dimensional image display area setting module 61 may transmit coordinate information designating the first area to the control IC 31 to set the first area in the screen as the autostereoscopic 3D area.

Upon receiving a 3D request from the second 3D-capable application program 52 when a three-dimensional image is displayed in the first area in the screen corresponding to the window of the first 3D-capable application program 51, the control module 62 controls to permit or deny the 3D request. If the 3D request is permitted, the second 3D-capable application program 52 operates in the 3D mode. On the other hand, if the 3D request is denied, the second 3D-capable application program 52 operates in the 2D mode.

More specifically, the control module 62 sets, as the autostereoscopic 3D area, one of the first area in the screen corresponding to the window of the first 3D-capable application program 51 and a second area in the screen corresponding to the window of the second 3D-capable application program 52 so that a three-dimensional image based on a plurality of parallax images corresponding to content processed by one of the first 3D-capable application program 51 and the second 3D-capable application program 52 is displayed in one of the first area and the second area. Furthermore, the control module 62 causes the other one of the first 3D-capable application program 51 and the second 3D-capable application program 52 to render a single two-dimensional image corresponding to content processed by the other one of the first 3D-capable application program 51 and the second 3D-capable application program 52 by instructing the other one of the first 3D-capable application program 51 and the second 3D-capable application program 52 to operate in the 2D mode so that the single two-dimensional image corresponding to the content processed by the other one of the first 3D-capable application program 51 and the second 3D-capable application program 52 is displayed in the other one of the first area and the second area.

Based on the image data rendered in the VRAM 14A, the GPU 14 generates a video signal for forming a screen image. The control IC 31 includes a pixel arrangement conversion module 31A and a lens control module 31B. The pixel arrangement conversion module 31A receives the video signal from the GPU 14, and also receives 3D area information from the control program 13B. The 3D area information is coordinate information indicating an area (for example, a rectangular area) within the screen, which should be set as the autostereoscopic 3D area. The 3D area information may include four pieces of coordinate information indicating the positions of the four vertices of the rectangular area.

Based on the 3D area information, the pixel arrangement conversion module 31A extracts an image portion corresponding to the autostereoscopic 3D area from the image of the whole screen corresponding to the received video signal. Then, the pixel arrangement conversion module 31A executes pixel arrangement conversion processing for the extracted image portion. In the pixel arrangement conversion processing, a plurality of parallax images included in the extracted image portion are rearranged so that the pixels of the plurality of parallax images are alternately arranged in the horizontal direction. If, for example, two parallax images including an image for the left eye and that for the right eye are used as the plurality of parallax images, the image for the left eye and that for the right eye are rearranged so that the pixels of the image for the left eye and those of the image for the right eye are alternately arranged in the horizontal direction. With this processing, the pixels of the image for the left eye and those of the image for the right eye are alternately displayed in the horizontal direction in the area corresponding to the autostereoscopic 3D area of the screen of the LCD 15A. On the other hand, an image portion other than that corresponding to the autostereoscopic 3D area is displayed on the LCD 15A without undergoing pixel arrangement conversion processing.

The lens control module 31B controls the lens unit 15B based on the 3D area information so that a portion of the lens unit 15B corresponding to the autostereoscopic 3D area has a predetermined refractive index distribution.

An autostereoscopic 3D area exclusive control processing procedure executed by the control program 13B will now be described with reference to a flowchart shown in FIG. 7.

The control program 13B receives a 3D request from a 3D application program (step S11). As described above, upon start of the 3D application program, the 3D application program may send the 3D request to the control program 13B. Alternatively, when the user operates a 3D button on a graphical user interface (GUI) displayed by the 3D application program, the 3D application program may send the 3D request to the control program 13B. The GUI including the 3D button may be displayed within the window of the 3D application program, or may be displayed on the desktop screen instead of the window of the 3D application program.

Upon receiving the 3D request from the given 3D application program, the control program 13B determines whether another 3D application program uses an autostereoscopic 3D area (3D window), that is, whether any area of the screen of the autostereoscopic 3D display 15 has been set as the autostereoscopic 3D area (step S12).

If another 3D application program does not use the autostereoscopic 3D area (3D window), that is, no area of the screen of the autostereoscopic 3D display 15 has been set as the autostereoscopic 3D area (NO in step S12), the control program 13B permits the 3D request, that is, notifies the 3D application program, which has transmitted the 3D request, of permission of the 3D request (step S15). In step S15, the control program 13B sets, as the autostereoscopic 3D area, an area of the screen corresponding to the window of the 3D application program which has transmitted the 3D request so that a three-dimensional image based on a plurality of parallax images rendered by the 3D application program is displayed in the window. In this case, the control program 13B transmits, to the control IC 31, 3D area information designating the area of the screen corresponding to the window of the 3D application program which has transmitted the 3D request. The 3D area information may be contained in the 3D request. The control IC 31 executes the above-described pixel arrangement conversion processing and a lens control operation so that the three-dimensional image is displayed in the area, within the screen, designated by the 3D area information.

If another 3D application program is already using the autostereoscopic 3D area (3D window), that is, any one area of the screen of the autostereoscopic 3D display 15 has already been set as the autostereoscopic 3D area (YES in step S12), the control program 13B requests the 3D application program which is using the autostereoscopic 3D area (3D window) to end a 3D mode (that is, an operation of rendering a plurality of parallax images), in order to change the operation mode of the 3D application program which is using the autostereoscopic 3D area (3D window) to a 2D mode (step S13).

If the 3D application program which used the autostereoscopic 3D area (3D window) has accepted the 3D mode end request, that is, the 3D application program which used the autostereoscopic 3D area (3D window) has ended the 3D mode (YES in step S14), the control program 13B executes processing of permitting the 3D request, that is, processing of notifying the 3D application program, which has transmitted the 3D request, of permission of the 3D request (step S15).

In step S15, the control program 13B sets, as the autostereoscopic 3D area, an area of the screen corresponding to the window of the 3D application program which has transmitted the 3D request so that a three-dimensional image based on a plurality of parallax images rendered by the 3D application program is displayed in the window. Furthermore, in order to cause the 3D application program which used the autostereoscopic 3D area (3D window) to operate in the 2D mode in which a single two-dimensional image is rendered, the control program 13B may request the 2D mode to the 3D application program. The 3D application program which used the autostereoscopic 3D area (3D window) may be configured to automatically transit to the 2D mode upon receiving the 3D mode end request. In this case, execution of the processing of explicitly requesting the 2D mode to the 3D application program may be omitted.

As described above, by requesting the 3D application program which is using the autostereoscopic 3D area (3D window) to end the 3D mode, it is possible to cause another 3D application program which has transmitted the 3D request later to preferentially use the autostereoscopic 3D area. It can be assumed that the user wants to preferentially use the 3D application program which has transmitted the 3D request later. It is, therefore, possible to implement exclusive control as intended by the user by causing the 3D application program which has transmitted the 3D request later to preferentially use the autostereoscopic 3D area.

The 3D application program which is using the autostereoscopic 3D area (3D window) may not accept the 3D mode end request, that is, the 3D application program which is using the autostereoscopic 3D area (3D window) may not end the 3D mode. For example, a 3D application program which does not support the 2D mode may not end the 3D mode. Even a 3D application program which supports both the 2D mode and the 3D mode may not be able to change the operation mode to the 2D mode depending on content currently processed. In this case, the 3D application program may not accept the 3D mode end request.

If the 3D application program which is using the autostereoscopic 3D area (3D window) does not accept the 3D mode end request, that is, the 3D application program which is using the autostereoscopic 3D area (3D window) does not end the 3D mode (NO in step S14), the control program 13B executes processing of denying the 3D request, that is, processing of notifying the 3D application program, which has transmitted the 3D request, of denial of the 3D request (step S16).

In step S16, to cause the 3D application program which has transmitted the 3D request to operate in the 2D mode, the control program 13B may request the 2D mode to the 3D application program. If the 3D application program which has transmitted the 3D request can operate in the 2D mode, it operates in the 2D mode. Note that if the 3D application program which has transmitted the 3D request is configured to automatically transit to the 2D mode when the 3D request is denied, execution of processing of requesting the 2D mode to the 3D application program may be omitted. The control program 13B maintains, as the autostereoscopic 3D area, the window of the 3D application program which is using the autostereoscopic 3D area (3D window).

Note that a priority order has been assumed not to be assigned to each 3D application program in this example. Based on a priority order assigned to each 3D application program in advance, however, the autostereoscopic 3D area (3D window) may be assigned to one of the 3D application program which is using the autostereoscopic 3D area and that which has newly transmitted the 3D request, and the other 3D application program may operate in the 2D mode in which one two-dimensional image is rendered.

For example, the autostereoscopic 3D area may be preferentially assigned to a 3D application program having higher priority, and a 3D application program having lower priority may operate in the 2D mode. If the 3D application program which is using the autostereoscopic 3D area (3D window) has the same priority as that of the 3D application program which has newly transmitted the 3D request, the autostereoscopic 3D area may be preferentially assigned to the 3D application program which has newly transmitted the 3D request.

As described above, according to the embodiment, a first area in a screen corresponding to the window of a first application program is set as a three-dimensional image display area (autostereoscopic 3D area) to display a three-dimensional image based on a plurality of parallax images corresponding to content processed by the first application program on the first area in the screen. If a request to display a three-dimensional image is received from a second application program in this state, one of the first area in the screen and a second area in the screen corresponding to the window of the second application program is set as the three-dimensional image display area to display a three-dimensional image based on a plurality of parallax images corresponding to content processed by one of the first application program and the second application program on one of the first area and the second area. Furthermore, processing is executed to cause the other one of the first application program and the second application program to render a single two-dimensional image corresponding to content processed by the other one of the first application program and the second application program to display the single two-dimensional image corresponding to the content processed by the other one of the first application program and the second application program on the other one of the first area and the second area.

It is, therefore, possible to deal with a conflict between 3D application programs without limiting the number of startable 3D application programs to one.

Furthermore, since the 3D application program which has not been assigned with the autostereoscopic 3D area is controlled to operate in the 2D mode in which not a plurality of parallax images but a single two-dimensional image is rendered, it is possible to prevent, from occurring, a phenomenon in which a plurality of parallax images corresponding to the same content are simultaneously displayed.

Note that a case in which the autostereoscopic 3D display 15 is a two-view autostereoscopic 3D display has been mainly described above. The autostereoscopic 3D display 15, however, may be a multi-view autostereoscopic 3D display.

Note that since the whole exclusive control processing procedure of the embodiment can be executed by software, it is possible to readily obtain the same effects as those in the embodiment only by installing, through a computer-readable storage medium having stored thereon a program for executing the exclusive control processing procedure of the embodiment, the program on a computer which includes an autostereoscopic 3D display capable of displaying a three-dimensional image in a three-dimensional image display area set within a screen, and executing the program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a three-dimensional display to display a three-dimensional image in a three-dimensional image display area set in a screen; and
   processing circuitry to set a first area in the screen corresponding to a window of a first application program as the three-dimensional image display area in order to display in the first area a three-dimensional image based on a plurality of parallax images corresponding to content processed by the first application program,
   the processing circuitry to:
      request, in response to a request to display a three-dimensional image from a second application program, the first application program to end an operation of rendering the plurality of parallax images and cause the first application program to render a single two-dimensional image corresponding to the content processed by the first application program;
      set a second area in the screen corresponding to a window of the second application program as the three-dimensional image display in order to display in the second area a three-dimensional image based on a plurality of parallax images corresponding to content processed by the second application program when the first application program accepts the request; and
      request the second application program to render a single two-dimensional image corresponding to the content processed by the second application program when the first application program denies the request.

2. The apparatus of claim 1, wherein:
   the first application program is configured to render the plurality of parallax images corresponding to the content processed by the first application program while the first application program is in a three-dimensional mode, and to render a single two-dimensional image corresponding to the content processed by the first application program while the first application program is in a two-dimensional mode,
   the second application program is configured to render the plurality of parallax images corresponding to the content processed by the second application program while the second application program is in a three-dimensional mode, and to render a single two-dimensional image corresponding to the contents processed by the second application program while the second application program is in a two-dimensional mode,
   the request of the first application program includes requesting the first application program to operate in the two-dimensional mode, and
   the request of the second application program includes requesting the second application program to operate in the two-dimensional mode.

3. A method of controlling an information processing apparatus comprising a three-dimensional display capable of displaying a three-dimensional image in a three-dimensional image display area set in a screen, the method comprising:
   setting a first area in the screen corresponding to a window of a first application program as the three-dimensional image display area in order to display in the first area a three-dimensional image based on a plurality of parallax images corresponding to content processed by the first application program;
   requesting, in response to a request to display a three-dimensional image from a second application program, the first application program to end an operation of rendering the plurality of parallax images and cause the first application program to render a single two-dimensional image corresponding to the content processed by the first application program;
   setting a second area in the screen corresponding to a window of the second application program as the three-dimensional image display in order to display in the second area a three-dimensional image based on a plurality of parallax images corresponding to content processed by the second application program when the first application program accepts the request; and
   requesting the second application program to render a single two-dimensional image corresponding to the content processed by the second application program when the first application program denies the request.

4. The method of claim 3, wherein:
   the first application program is configured to render the plurality of parallax images corresponding to the content processed by the first application program while the first application program is in a three-dimensional mode, and to render a single two-dimensional image corresponding to the content processed by the first application program while the first application program is in a two-dimensional mode,
   the second application program is configured to render the plurality of parallax images corresponding to the content processed by the second application program while the second application program is in a three-dimensional mode, and to render a single two-dimensional image corresponding to the contents processed by the second application program while the second application program is in a two-dimensional mode,
   the request of the first application program includes requesting the first application program to operate in the two-dimensional mode, and
   the request of the second application program includes requesting the second application program to operate in the two-dimensional mode.

5. A computer-readable, non-transitory storage medium having stored thereon a computer program controlling a computer comprising a three-dimensional display capable of displaying a three-dimensional image in a three-dimensional image display area set in a screen, to execute functions of:

program as the three-dimensional image display area in order to display in the first area a three-dimensional image based on a plurality of parallax images corresponding to content processed by the first application program;

requesting, in response to a request to display a three-dimensional image from a second application program, the first application program to end an operation of rendering the plurality of parallax images and cause the first application program to render a single two-dimensional image corresponding to the content processed by the first application program;

setting a second area in the screen corresponding to a window of the second application program as the three-dimensional image display in order to display in the second area a three-dimensional image based on a plurality of parallax images corresponding to content processed by the second application program when the first application program accepts the request; and requesting the second application program to render a single two-dimensional image corresponding to the content processed by the second application program when the first application program denies the request.

6. The storage medium of claim 5, wherein:

the first application program is configured to render the plurality of parallax images corresponding to the content processed by the first application program while the first application program is in a three-dimensional mode, and to render a single two-dimensional image corresponding to the content processed by the first application program while the first application program is in a two-dimensional mode, the second application program is configured to render the plurality of parallax images corresponding to the content processed by the second application program while the second application program is in a three-dimensional mode, and to render a single two-dimensional image corresponding to the contents processed by the second application program while the second application program is in a two-dimensional mode, the request of the first application program includes requesting the first application program to operate in the two-dimensional mode, and the request of the second application program includes requesting the second application program to operate in the two-dimensional mode.

* * * * *